US008061374B2

(12) United States Patent
Li

(10) Patent No.: US 8,061,374 B2
(45) Date of Patent: Nov. 22, 2011

(54) INTELLIGENT OUTDOOR SUN SHADING DEVICE

(76) Inventor: Wanda Ying Li, Santa Ana, CA (US)

( * ) Notice: Subject to any disclaimer, the term of this patent is extended or adjusted under 35 U.S.C. 154(b) by 101 days.

(21) Appl. No.: 12/315,120

(22) Filed: Nov. 28, 2008

(65) Prior Publication Data

US 2010/0132751 A1    Jun. 3, 2010

(51) Int. Cl.
*E04H 15/28* (2006.01)
(52) U.S. Cl. ............................ 135/16; 135/96
(58) Field of Classification Search ............. 35/16, 20.3, 35/96; 135/16, 20.3, 96
See application file for complete search history.

(56) References Cited

U.S. PATENT DOCUMENTS

| 2,960,094 | A  | * | 11/1960 | Small ............................ 135/22 |
| 6,923,193 | B2 | * | 8/2005  | Chen ............................ 135/20.1 |
| 7,128,076 | B2 | * | 10/2006 | Freedman .................... 135/20.3 |
| 7,631,653 | B2 | * | 12/2009 | Young et al. .................. 135/15.1 |
| 7,665,477 | B1 | * | 2/2010  | Hathaway .................... 135/20.3 |
| 2005/0016571 | A1 | * | 1/2005 | Wu ............................... 135/20.1 |
| 2005/0072451 | A1 | * | 4/2005 | Vivian et al. .................... 135/16 |
| 2007/0242450 | A1 | * | 10/2007 | Blatecky ....................... 362/102 |
| 2009/0314319 | A1 | * | 12/2009 | Young et al. .................... 135/16 |
| 2009/0320827 | A1 | * | 12/2009 | Thompson et al. ........... 126/576 |

* cited by examiner

*Primary Examiner* — Noah Chandler Hawk
(74) *Attorney, Agent, or Firm* — Raymond Y. Chan; David and Raymond Patent Firm

(57) ABSTRACT

An intelligent outdoor sun shading device includes a shading system, an environmental sensor device and a functional controller. The shading system includes a supporting frame, a power source supported at the supporting frame, an awning frame suspendedly and movably supported by the supporting frame, and a sun shelter mounted to the awning frame to define a shading area under the sun shelter. The environmental sensor device is electrically linked to the power source and is installed to the shading system for detecting an environmental change of the shading system in responsive to the shading area thereof. The functional controller is electrically linked to the environmental sensor device and is operatively controlled the awning frame of the shading system, wherein when the functional controller receives a command signal from the environmental sensor device, the awning frame is automatically adjusted to regulate the shading area thereof in responsive to the environmental change of the shading system.

10 Claims, 5 Drawing Sheets

INTELLIGENT OUTDOOR SUN SHADING DEVICE

BACKGROUND OF THE PRESENT INVENTION

1. Field of Invention

The present invention relates to a sun shading device, and more particularly to an intelligent outdoor sun shading device comprising a shading system and a functional controller for adjusting the shading system to optimally respond to the environmental condition in which the sun shading device operates.

2. Description of Related Arts

A conventional sun shading device, such as a convention outdoor umbrella, usually comprises a supporting frame and a sun shading system mounted by the supporting frame to define a predetermined shading area under the sun shading system. Over the years, there have been extensive developments for improving the quality and functions of such a conventional sun shading device. For example, an outdoor umbrella may be equipped with a solar energy collection arrangement and a lighting system for providing environmentally friendly illumination for the relevant users. Moreover, a conventional gazebo may be equipped with a specially designed ventilation system so that users of the gazebo have adequate access to fresh air when they are gathering within the gazebo while preserving their privacy.

Notwithstanding these developments, conventional sun shading devices, even with some sophisticated improvements, such as the above mentioned lighting system and the ventilation system, are usually not responsive enough to the change of environmental circumstances in which the sun shading devices operate. This discrepancy may be partially resolved by manual operation of the sun shading devices. For example, a user may easily turn on or turn off the illumination system whenever necessary. In some situations, however, frequent manual operation of the sun shading system may mean inconvenience and interruption of a scheduled activity in the sun shading system. A good example is that when a user utilizes an outdoor umbrella in a very sunny environment, he or she may need to adjust the angle of inclination of the awning fabric in order it to provide an optimal sun shading effect. However, as time goes by, the angle of inclination of the awning fabric may need adjustment because of the change of position of the sun throughout the day. As a result, in order to keep the same standard of sun shading quality of the sun shading system, the user may have to manually adjust the angle of inclination of the awning fabric so that the angle of inclination always corresponds with the sun position. This imparts extreme inconvenience on the part of the user or the one who is responsible for adjusting the angle of the awning fabric.

SUMMARY OF THE PRESENT INVENTION

A main object of the present invention is to provide an intelligent outdoor sun shading device comprising a shading system and a functional controller for adjusting the shading system to optimally respond to the environmental condition in which the sun shading device operates.

Another object of the present invention is to provide an intelligent outdoor sun shading device comprising an environmental sensor device and a functional controller for controlling the shading system in responsive to environmental change in the location where the intelligent outdoor sun shading device operates. In other words, the functional controller automatically and optimally adjusts the settings of the shading system whenever necessary with minimal user's involvement.

Another object of the present invention is to provide an intelligent outdoor sun shading device which is capable of incorporating a wide variety of environmentally-related devices (such as an illumination system) as an automatic and self-adjustment system for ensuring that when the environment changes, the corresponding environmentally-related devices are activated or deactivated to cater for that environmental change without substantive human intervention.

Another object of the present invention is to provide an intelligent outdoor sun shading device comprising a shading system which is adapted to form as a wide variety of sun shading systems, such as outdoor umbrellas, gazebos etc., so as to facilitate widespread applications of the present invention.

Accordingly, in order to accomplish the above objects, the present invention provides an intelligent outdoor sun shading device, comprising:

a shading system which comprises a supporting frame, a power source supported at the supporting frame, an awning frame suspendedly and movably supported by the supporting frame, and a sun shelter mounted to the awning frame to define a shading area under the sun shelter;

an environmental sensor device which is electrically linked to the power source and is installed to the shading system for detecting an environmental change of the shading system in responsive to the shading area thereof; and a functional controller which is electrically linked to the environmental sensor device and is operatively controlled the awning frame of the shading system, wherein when the functional controller receives a command signal from the environmental sensor device, the awning frame is automatically adjusted to regulate the shading area thereof in responsive to the environmental change of the shading system.

These and other objectives, features, and advantages of the present invention will become apparent from the following detailed description, the accompanying drawings, and the appended claims.

DETAILED DESCRIPTION OF THE PREFERRED EMBODIMENT

Figure 1:
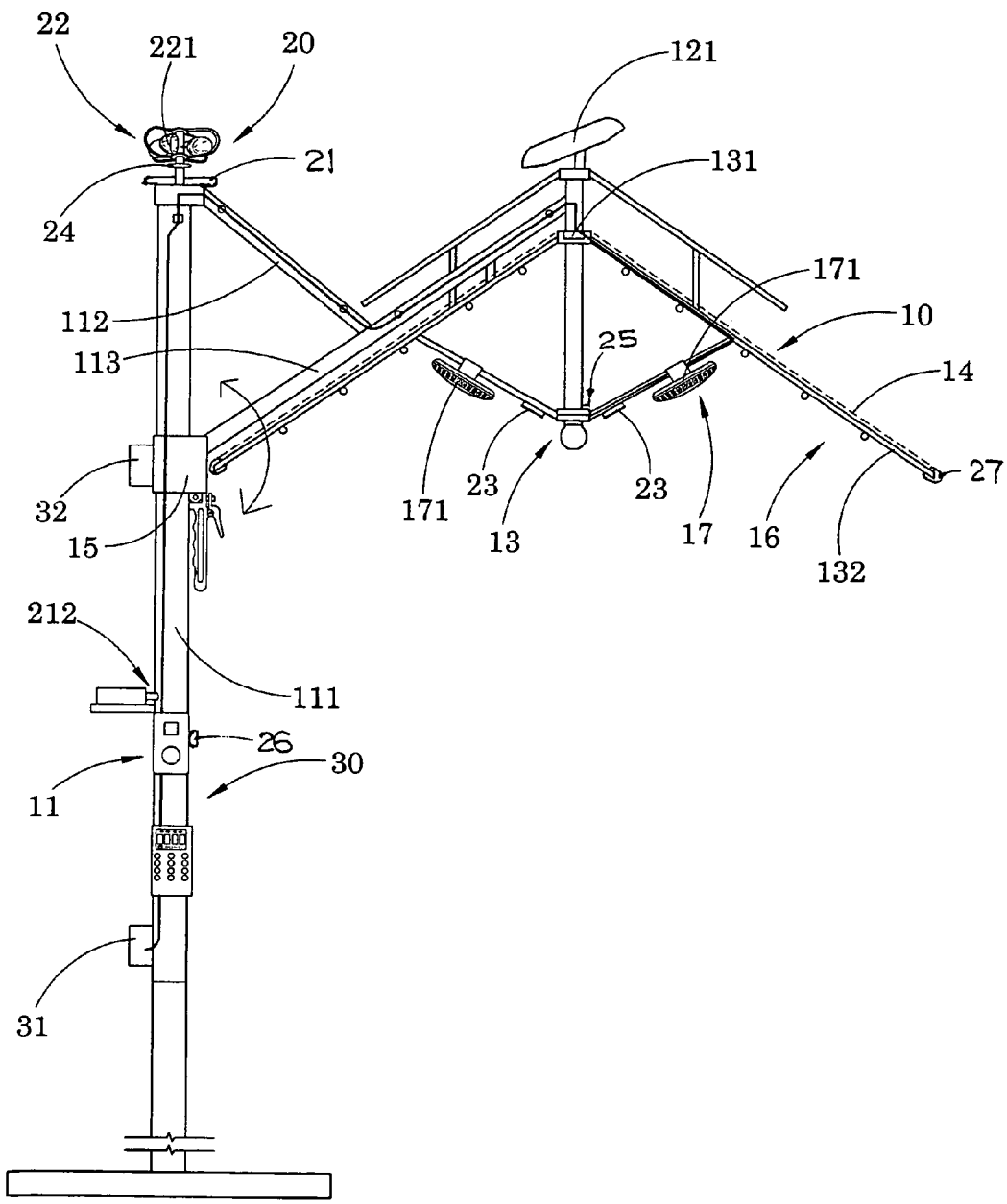
FIG. 1 is a side view of the intelligent outdoor sun shading device according to a preferred embodiment of the present invention.
Figure 2:
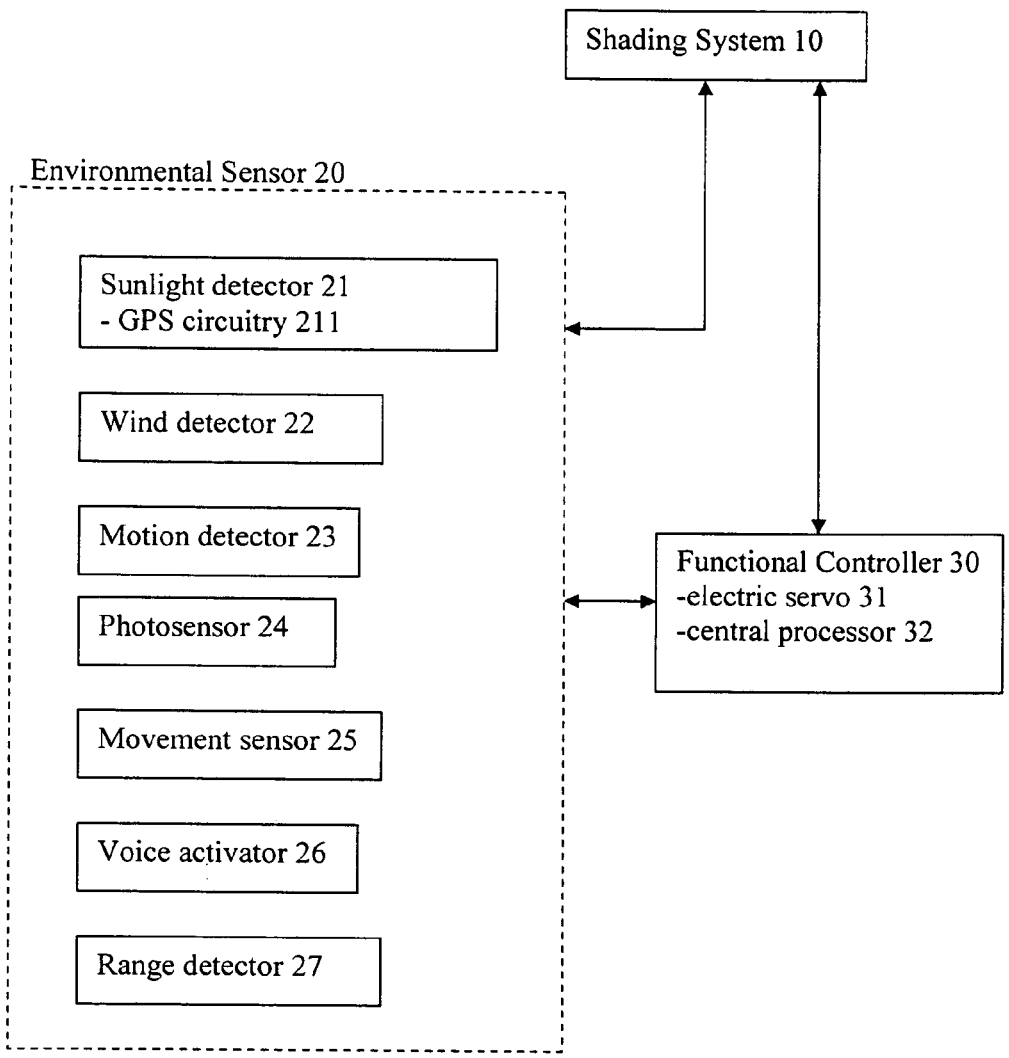
FIG. 2 is a schematic diagram of the intelligent outdoor sun shading device according to the above preferred embodiment of the present invention.
Figure 3:
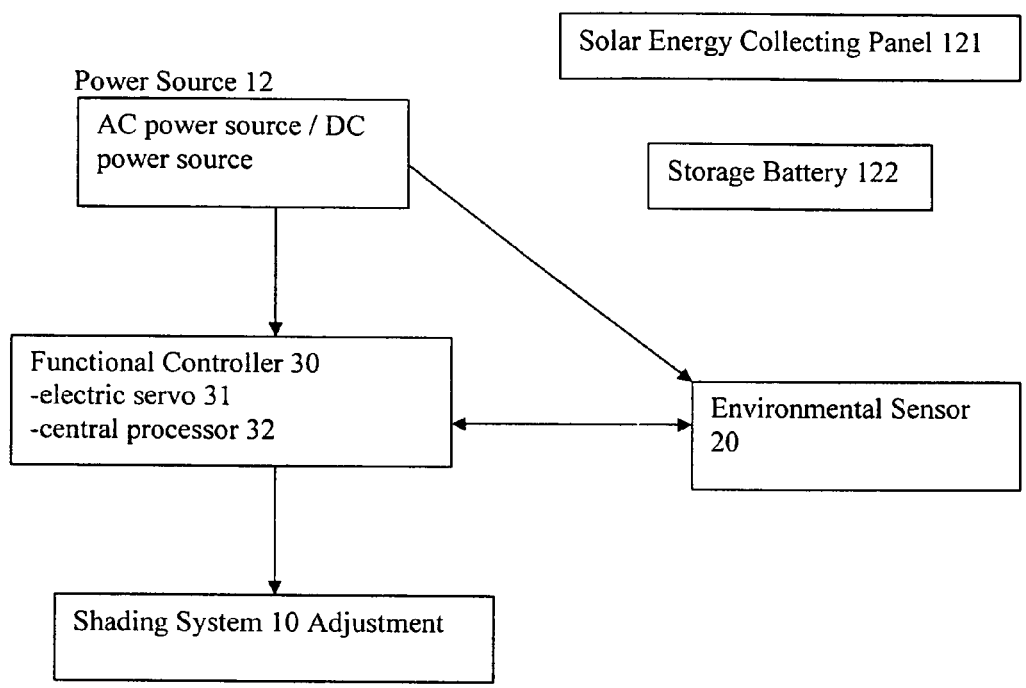
FIG. 3 is a schematic diagram of the intelligent outdoor sun shading device according to the above preferred embodiment of the present invention, illustrating the operation of the power source.

Referring to FIG. 1 to FIG. 3 of the drawings, an intelligent outdoor sun shading device, such as an outdoor umbrella, according to a preferred embodiment of the present invention is illustrated, in which the intelligent outdoor sun shading device comprises a shading system 10, an environmental sensor device 20, and a functional controller 30.

The shading system 10 comprises a supporting frame 11, a power source 12 supported at the supporting frame 11, an awning frame 13 suspendedly and movably supported by the supporting frame 11, and a sun shelter 14 mounted to the awning frame 13 to define a shading area under the sun shelter 14. In a preferred embodiment of the present embodiment, the power source 12 is an AC power supply connected with the wall socket. In an alternative embodiment, the power source 12 is a solar power supply. The power source provides 12V AC, 12V DC, 5V DC for different electric elements.

The environmental sensor device 20 is electrically linked to the power source 12 and is installed to the shading system 10 for detecting an environmental change of the shading system 10 in responsive to the shading area thereof.

The functional controller 30 is electrically linked to the environmental sensor device 20 and operatively controls the awning frame 13 of the shading system 10, wherein when the functional controller 30 receives a command signal from the environmental sensor device 20, the awning frame 13 is automatically adjusted to regulate the shading area thereof in responsive to the environmental change of the shading system 10.

According to the preferred embodiment of the present invention, the supporting frame 11 comprises a supporting post 111, a retention member 112, and a supporting member 113 supporting the supporting post 111 with the awning frame 13 in a movable manner. As shown in FIG. 1 of the drawings, the intelligent outdoor sun shading device is illustrated to be an outdoor umbrella, yet one skill in the art should appreciate that the present invention can be embodied as a wide variety of sun shading devices, such as a gazebo and a canopy. The awning frame 13 comprises an upper housing 131 supported by the retention member 112 and the supporting member 113, and a plurality of awning members 132 radially and foldably extended from the upper housing 131 to suspendedly support the sun shelter 14 on top of the awning members 132, wherein the awning frame 13 is capable of moving between a folded position and an unfolded position, wherein in the folded position, the awning members 132 are pivotally and inwardly folded to form a compact structure by the supporting frame 11, wherein when the awning frame 13 is in the unfolded position, the awning members 132 are pivotally and unfolded and radially extend from the upper housing 131 to suspendedly support the sun shelter 14. The sun shelter 14 comprises a shading fabric foldably attached onto the awning frame 13 for blocking sunlight from penetrating through the sun shelter 14.

Moreover, the shading system 10 further comprises an angular joint 15 coupling the awning frame 13 with the supporting frame 11, wherein the awning frame 13 is operatively controlled by the functional controller 30 to selectively adjust an orientation of the awning frame 13 through the angular joint 15 such that the sun shelter 14 is adjusted to face toward the direction of the sun for maximizing a shading effect of the sun shelter 14.

In a preferred embodiment of the present invention, the angular joint 15 is slidable along the supporting post 111, and can be selectively fixed on the supporting post 111. The angular joint 15 is also pivotally connected with the supporting member 113. Referring to FIG. 1, one end of the retention member 112 is pivotally connected with the top of the supporting post 111, the other end of the retention member 112 is pivotally connected with the middle portion of the supporting member 113. In this manner, when the angular joint 15 is sliding along the supporting post 111, the angle between the supporting post 111 and the supporting member 113 is changing accordingly. As a result, the facing direction of the sun shelter 14 is also changed. In this way a best shading effect of the sun shelter 14 can be adjusted regarding the direction of the sun shine.

Figure 4:
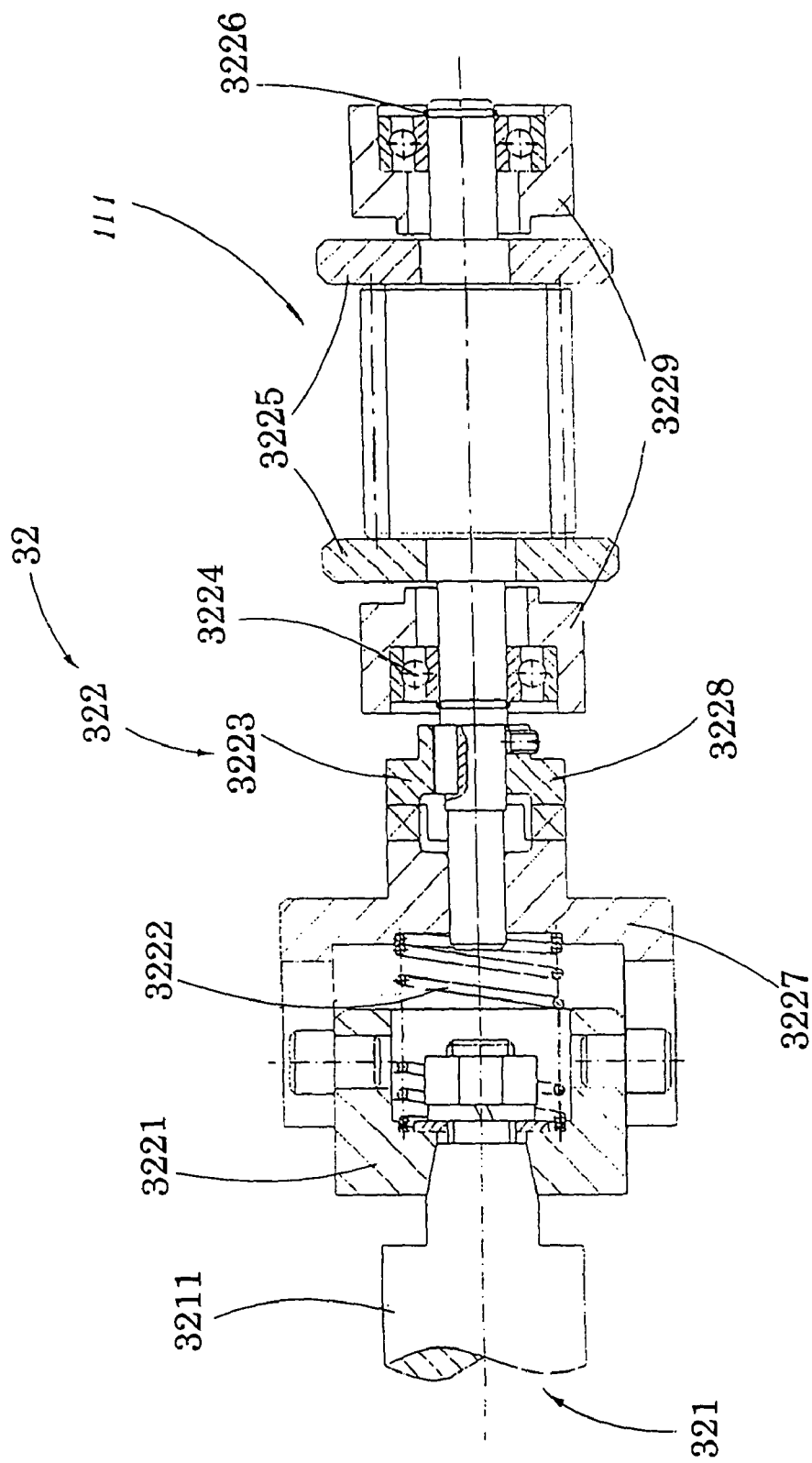
FIG. 4 is a sectional view of the structure of the direction electric servo installed on the supporting post for automatically control the facing direction of the awning frame.

It is worth mentioning, in a preferred embodiment of the present invention, the angular joint 15 is driven by an electric servo to realize automatic control. The functional controller 30 comprises a direction electric servo 32 which is electrically linked to the power source 12 and is operatively controlled by the functional controller 30 to automatically and selectively position and lock the angular joint 15. Referring to FIG. 4, the direction electric servo 32 comprises a servo motor 321 providing the driving power, a transmission arrangement 322 which transfer the power from the servo motor 321 to the angular joint 15. In the preferred embodiment, the servo motor 321 has a shaft 3211. The transmission arrangement 322 has a motor sleeve 3221, a reset spring 3222, a semi coupling 3223, a rolling bearing 3224, a roll guide 3225, a spring collar 3226, a clutch 3227, a coupling 3228, and a sliding handle 3229. In the preferred embodiment of the present invention, the servo motor is a DC motor working on 12V DC power supply, the output power is 50 W. The rotation of the motor is reduced and transferred to a linear movement by a worm gear. The transmission arrangement 322 is a rack-and-pinion structure. The rack is attached longitudinally along the supporting post 111, and the pinion is mechanically connected with the worm gear of the servo motor through a clutch. The angular joint 15 is mechanically connected with the servo motor and is driven by the motor to move along the supporting post 111 through the rack. By controlling the servo motor, the functional controller can control the position of the angular joint 15, and consequently control the facing direction of the sun shelter 14.

Accordingly, the environmental sensor device 20 comprises a sunlight detector 21 provided on top of the shading system 10 such as mounted on top of the sun shelter 14 or on top of the supporting post 111 as embodied in the preferred embodiment and is electrically linked to the functional controller 30, such that when the sunlight detector 21 detects the direction of the sun, the sun shelter 14 and the awning frame 13 are adjusted to face towards the direction of the sun as activated by the functional controller 30. In order to precisely detect an orientation of the sunlight direction, the sunlight detector 21 comprises a GPS circuitry 211 electrically linked to the functional controller 30 for automatically tracking the direction of the sun. In other words, the sunlight information can be obtained through GPS signal received by the GPS circuitry 211, with the information of location and time, sunlight direction can be calculated. As a result, the sunlight detector 21 further comprises a GPS port 212 provided at the supporting frame 11 of the shading system 10 for operatively linked to a GSP device for automatically tracking the direction of the sun.

It is worth mentioning that the GPS device can be built-in to the supporting frame 11. Alternatively, it can be an external GPS device, such as a conventional GPS navigation system specifically programmed to receive sunlight information through satellite signal. In the latter case, the user is able to bring his or her own GPS device to conveniently connect with the GPS circuitry 211 through the GPS port 212 for obtaining the sunlight information.

Moreover, the environmental sensor device 20 further comprises a wind detector 22 which is installed on top of the supporting frame 11 (the supporting post 111 specifically) and is electrically linked to the functional controller 30, such that when the wind detector 22 detects the direction of the wind, the sun shelter 14 is adjusted through the angular joint 15 to minimize a wind loading on the sun shelter 14, or to close the sun shelter 14, so as to avoid the shading system 10 to be accidentally flipped over and causing personal injuries. The wind detector 22 can be a conventional mechanical-type wind detector which is capable of detecting the velocity of the incoming wind so that it can transmit the corresponding signal to the functional controller 30 when adjustment of angle of inclination of the awning frame 13 is necessary. As shown in FIG. 1 of the drawings, the wind detector 22 comprises a rotation blade 221 rotatably supported at the supporting frame 11 for exposing to ambient wind, wherein when the rotation blade 221 is blown to rotate, the rotational speed is adapted to accurately reflect the speed of the incoming wind.

In order to enhance a utility feature of the present invention, the environmental sensor device 20 further comprises a motion detector 23 which is mounted at the supporting frame 11 and is electrically linked to the functional controller 30, such that when the motion detector 23 detects the presence of a user within a detection area, the sun shelter 14 is actuated to fold at the unfolded position.

On the other hand, the functional controller 30 comprises an electric servo 31 which is electrically linked to the power source 12 and is operatively controlled by the functional controller 30 to automatically and selectively actuate the awning frame 13 between an unfolded position that the sun shelter 14 is expanded to maximize the shading area thereof, and a folded position that the sun shelter 14 is folded up to minimize the shading area thereof. As a result, the electric servo 31 is electrically connected to the wind detector 22 and the motion detector 23 so that the awning frame 13 is capable of timely responding to the environmental change surrounding the intelligent outdoor sun shading device.

Figure 5:
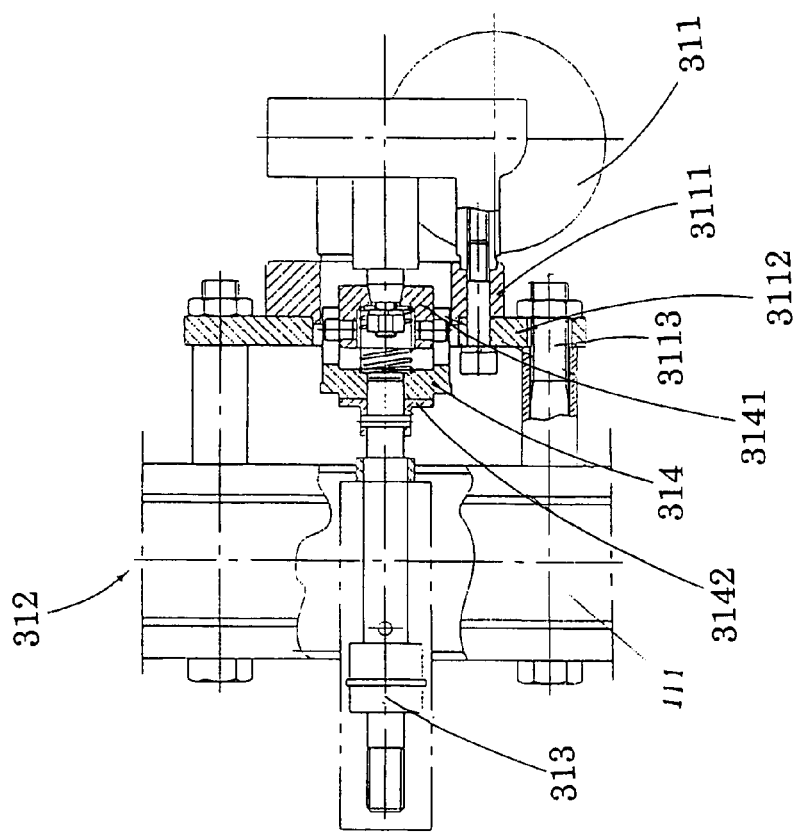
FIG. 5 is a sectional view of the structure of the direction electric servo installed on the supporting post for automatically fold and unfold the sun shelter.

Referring to FIG. 5, in a preferred embodiment of the present invention, the electric servo 31 comprises a DC motor 311 providing the driving power, a string arrangement 312 mechanically connected with the upper housing 131, a rolling axes 313 rolling the string arrangement 312, and a clutch 314 mechanically connected the DC motor 311 and the rolling axes 313 through a motor sleeve 3141 and a coupling 3142. The DC motor 311 is fixed in a motor seat 3111 which is attached on the supporting post 111 by a connecting board 3112 and screws 3113, and it works on 12V DC power supply, the output power is 50 W. The DC motor is controlled by the functional controller 30. When the DC motor is rotating in a predetermined direction, the rolling axes will roll the string arrangement and open the sun shelter 14 through the upper housing 131. When the DC motor is rotating in the opposite direction, the rolling axes will release the string arrangement and close the sun shelter 14 through the upper housing 131.

According to the preferred embodiment of the present invention, the shading system 10 further comprises a light module 16 supported at the awning frame 13 for illuminating the shading area, wherein the environmental sensor device 20 further comprises a photosensor 24 which is mounted at the supporting frame 11 and is electrically linked to the light module 16, such that when the photosensor 24 detects a light brightness of an environment of the shading system 10 being lower than a preset light level threshold, the light module 16 is activated for providing extra illumination to the shading area. Similarly, when the ambient brightness is above the threshold brightness level, the photosensor 24 is arranged to produce the corresponding signal so as to deactivate the light module 16. According to the preferred embodiment of the present invention, the light module 16 may comprise a conventional light bulb, or a plurality of LEDs for providing optimal illumination to the shading area.

The shading system 10 further comprises a sound module 17 which is electrically linked to the environmental sensor device 20 and is supported at the awning frame 13 for generating an audio effect within the shading area, wherein the environmental sensor device 20 comprises a movement sensor 25 detecting the awning frame 13 at the unfolded and folded positions, such that when the movement sensor 25 detects the awning frame 13 at the unfolded position, the sound module 17 is automatically activated for generating the audio effect, and when the movement sensor 25 detects the awning frame 13 at the folded position, the sound module 17 is automatically deactivated. The sound module 17 comprises at least one audio speaker 171 mounted onto the awning frame 13 and is electrically connected to the power source 12 for delivering audible sound to the shading area when the sound module 17 is activated.

In order to utilize an environmentally friendly power source as the power source 12 of the present invention, the power source 12 comprises at least one solar energy collecting panel 121 supported above the awning frame 13 for collecting solar energy and converting the solar energy into electrical energy, and a storage battery 122 linked to the solar energy collecting panel 121 for storing the electrical energy to supply the functional controller 30 and the electrical components of the shading system 10, such as the light module 16 and the sound module 17.

On the other hand, the environmental sensor device 20 further comprises a voice activator 26 which is mounted at the supporting frame 11 and is electrically linked to the sound module 17, such that when the voice activator 26 detects an audio command, the sound module 17 is activated for generating the audio effect.

Moreover, the environmental sensor device 20 further comprises a range detector 27 which is mounted at the awning frame 13 and is electrically linked to the electric servo 31, such that when the range detector 27 detects the presence of a user within an awning folding range at the time the awning frame 13 is being folded to the unfolded position, the electric servo 31 is automatically deactivated to stop the awning frame 13 from being folded to the unfolded position or vice versa.

In order to coordinate and control the various electrical and mechanical components mentioned above, the functional controller 30 further comprises a central processor 32 supported by the supporting frame 11 to electrically connect with the environmental sensor device 20 and the shading system 10. The central processor 32 can be an integrated circuit or a more sophisticated processor which is pre-programmed to coordinate the environmental sensor device 20 and to control the operation of the shading system 10. For example, it manages and controls the electricity supply and demand between the power source 12 and the various electrical components (such as the light module 16).

In order to monitor the operation of the intelligent outdoor sun shading device, the environmental sensor device 20 may further comprise a monitoring display provided on the shading system 10 and is electrically connected with the central processor 32 for displaying the operational parameters of the intelligent outdoor sun shading device in a real-time basis. For example, the monitoring display may illustrate the date, time, wind speeds and wind direction at a particular instance in which the sun shading device is utilized.

In summary, the present invention provides an intelligent manner to control an outdoor sun shading device automatically. The opening and closing of the sun shelter 14, and the facing direction of the awning frame 13 are all driven by motors. The functional controller can actuate the motor according to the information sensed by the sensors. All these can be achieve by predetermined program, or by user's setting.

In a preferred embodiment, the operation of the intelligent sun shading device is programmed. First, the timer is set. Then the wind speed level is set, so when the wind speed reaches this level, the sun shelter 14 will be automatically folded. Also, the time of opening and closing the sun shelter 14 can be set. The sun shelter 14 can be automatically unfolded and folded regarding the time.

During the intelligent sun shading device operation, when it is the time to open, the wind detector 22 will detect the wind speed, and the sunlight detector 21 will detect the sun light, if in a predetermined period of time the wind speed is within the allowed level, and also the sun light is stronger than a predetermined level, the device will give a sound alarm to warn people around, and then open the sun shelter 14. The awning frame 13 will face the sun light for best efficiency. The wind detector 22 will detect the wind speed every 10 seconds, if the wind speed is larger than the predetermined level, the device will give a sound alarm to warn people around, and then fold the sun shelter 14. During the period the sun shelter 14 is open, the angular joint 15 keeps changing the facing direction of the awning frame 13 following the movement of the sun to provide best shading effect. When it is the time to close the sun shelter 14, the device will give a sound alarm to warn people around, and then close the sun shelter 14. The device can also receive commands from a remote control or acoustic signals.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An intelligent outdoor sun shading device, comprising:

a shading system which comprises a supporting frame, a power source supported at said supporting frame, an awning frame suspendedly and movably supported by said supporting frame, and a sun shelter mounted to said awning frame to define a shading area under said sun shelter;

an environmental sensor device which is electrically linked to said power source and is installed to said shading system for detecting an environmental change of said shading system; and a functional controller which is electrically linked to said environmental sensor device and is operatively controlled said awning frame of said shading system, wherein when said functional controller receives a command signal from said environmental sensor device, said awning frame is automatically adjusted to regulate said shading area thereof in responsive to the environmental change of said shading system, wherein said functional controller comprises an electric servo which is electrically linked to said power source and is operatively controlled by said functional controller to automatically and selectively actuate said awning frame between an unfolded position that said sun shelter is expanded to maximize said shading area thereof, and a folded position that said sun shelter is folded up to minimize said shading area thereof;

wherein said shading system further comprises an angular joint coupling said awning frame with said supporting frame, wherein said awning frame is operatively controlled by said functional controller to selectively adjust an orientation of said awning frame through said angular joint such that said sun shelter is adjusted to face towards the direction of the sun for maximizing a shading effect of said sun shelter;

wherein said environmental sensor device comprises a sunlight detector which is installed on top of said shading system and is electrically linked to said electric servo, such that when said sunlight detector detects the direction of the sun, said sun shelter is adjusted to face towards the direction of the sun;

wherein said environmental sensor device comprises a wind detector which is mounted on top of said supporting frame and is electrically linked to said electric servo, such that when said wind detector detects the direction of the wind, said sun shelter is adjusted to minimize a wind loading on said sun shelter, wherein said environmental sensor device comprises a motion detector which is installed to said supporting frame and is electrically linked to said electric servo, such that when said motion detector detects the presence of a user within a detection area, said sun shelter is actuated to fold at said unfolded position.

2. The intelligent outdoor sun shading device, as recited in claim 1, wherein said shading system further comprises a light module supported at said awning frame for illuminating said shading area, wherein said environmental sensor device comprises a photosensor which is mounted at said supporting frame and is electrically linked to said light module, such that when said photosensor detects a light level of an environment of said shading system being lower than a preset light level threshold, said light module is activated for illumination.

3. The intelligent outdoor sun shading device, as recited in claim 2, wherein said shading system further comprises a sound module which is electrically linked to said environmental sensor device and is supported at said awning frame for generating an audio effect within said shading area, wherein said environmental sensor device comprises a movement sensor detecting said awning frame at said unfolded and folded positions, such that when said movement sensor detects said awning frame at said unfolded position, said sound module is automatically activated for generating said audio effect, and when said movement sensor detects said awning frame at said folded position, said sound module is automatically deactivated.

4. The intelligent outdoor sun shading device, as recited in claim 3, wherein said environmental sensor device further comprises a voice activator which is installed to said supporting frame and is electrically linked to said sound module, such that when said voice activator detects an audio command, said sound module is activated for generating said audio effect.

5. The intelligent outdoor sun shading device, as recited in claim 3, wherein said environmental sensor device comprises a range detector which is installed to said awning frame and is electrically linked to said electric servo, such that when said range detector detects the presence of a user within an awning folding range at the time said awning frame is being folded to said unfolded position, said electric servo is automatically deactivated to stop said awning frame being folded to said unfolded position.

6. An intelligent outdoor sun shading device, comprising:
a shading system which comprises a sound module, a supporting frame, a power source supported at said supporting frame, an awning frame suspendedly and movably supported by said supporting frame, and a sun shelter mounted to said awning frame to define a shading area under said sun shelter;
an environmental sensor device which is electrically linked to said power source and is installed to said shading system for detecting an environmental change of said shading system; and
a functional controller which is electrically linked to said environmental sensor device and is operatively controlled said awning frame of said shading system, wherein when said functional controller receives a command signal from said environmental sensor device, said awning frame is automatically adjusted to regulate said shading area thereof in responsive to the environmental change of said shading system, wherein said functional controller comprises an electric servo which is electrically linked to said power source and is operatively controlled by said functional controller to automatically and selectively actuate said awning frame between an unfolded position that said sun shelter is expanded to maximize said shading area thereof, and a folded position that said sun shelter is folded up to minimize said shading area thereof;
wherein said shading system further comprises a light module and an angular joint coupling said awning frame with said supporting frame, wherein said awning frame is operatively controlled by said functional controller to selectively adjust an orientation of said awning frame through said angular joint such that said sun shelter is adjusted to face towards the direction of the sun for maximizing a shading effect of said sun shelter;
wherein said environmental sensor device comprises a sunlight detector which is installed on top of said shading system and is electrically linked to said electric servo, such that when said sunlight detector detects the direction of the sun, said sun shelter is adjusted to face towards the direction of the sun;
wherein said environmental sensor device comprises a range detector, a movement sensor, a photosensor and a wind detector which is mounted on top of said supporting frame and is electrically linked to said electric servo, such that when said wind detector detects the direction of the wind, said sun shelter is adjusted to minimize a wind loading on said sun shelter, wherein said environmental sensor device comprises a motion detector which is installed to said supporting frame and is electrically linked to said electric servo, such that when said motion detector detects the presence of a user within a detection area, said sun shelter is actuated to fold at said unfolded position, wherein said light module is supported at said awning frame for illuminating said shading area, wherein said photosensor is mounted at said supporting frame and is electrically linked to said light module, such that when said photosensor detects a light level of an environment of said shading system being lower than a preset light level threshold, said light module is activated for illumination,
wherein said sound module is electrically linked to said environmental sensor device and is supported at said awning frame for generating an audio effect within said shading area, wherein said movement sensor is arranged to detect said awning frame at said unfolded and folded positions, such that when said movement sensor detects said awning frame at said unfolded position, said sound module is automatically activated for generating said audio effect, and when said movement sensor detects said awning frame at said folded position, said sound module is automatically deactivated,
wherein said range detector is installed to said awning frame and is electrically linked to said electric servo, such that when said range detector detects the presence of a user within an awning folding range at the time said awning frame is being folded to said unfolded position, said electric servo is automatically deactivated to stop said awning frame being folded to said unfolded position, wherein said power source comprises at least a solar energy collecting panel supported above said shading system for collecting a solar energy and converting said solar energy into electrical energy, and a storage battery linked to said solar energy collecting panel for storing said electrical energy to supply said functional controller.

7. An intelligent outdoor sun shading device, comprising:
a shading system which comprises a supporting frame, a power source supported at said supporting frame, an awning frame suspendedly and movably supported by said supporting frame, and a sun shelter mounted to said awning frame to define a shading area under said sun shelter;
an environmental sensor device which is electrically linked to said power source and is installed to said shading system for detecting an environmental change of said shading area; and
a functional controller which is electrically linked to said environmental sensor device and is operatively controlled said awning frame of said shading system, wherein when said functional controller receives a command signal from said environmental sensor device, said awning frame is automatically adjusted to regulate said shading area thereof in responsive to the environmental change of said shading system;
wherein said functional controller comprises an electric servo which is electrically linked to said power source and is operatively controlled by said functional controller to automatically and selectively actuate said awning frame between an unfolded position that said sun shelter is expanded to maximize said shading area thereof, and a folded position that said sun shelter is folded up to minimize said shading area thereof;
wherein said shading system further comprises an angular joint coupling said awning frame with said supporting frame, wherein said awning frame is operatively controlled by said functional controller to selectively adjust an orientation of said awning frame through said angular joint such that said sun shelter is adjusted to face towards the direction of the sun for maximizing a shading effect of said sun shelter;
wherein said environmental sensor device comprises a motion detector which is installed to said supporting frame and is electrically linked to said electric servo, such that when said motion detector detects the presence of a user within a detection area, said sun shelter is actuated to fold at said unfolded position.

8. An intelligent outdoor sun shading device, comprising:
a shading system which comprises a supporting frame, a power source supported at said supporting frame, an awning frame suspendedly and movably supported by said supporting frame, and a sun shelter mounted to said awning frame to define a shading area under said sun shelter;

an environmental sensor device which is electrically linked to said power source and is installed to said shading system for detecting an environmental change of said shading area; and a functional controller which is electrically linked to said environmental sensor device and is operatively controlled said awning frame of said shading system, wherein when said functional controller receives a command signal from said environmental sensor device, said awning frame is automatically adjusted to regulate said shading area thereof in responsive to the environmental change of said shading system;

wherein said functional controller comprises an electric servo which is electrically linked to said power source and is operatively controlled by said functional controller to automatically and selectively actuate said awning frame between an unfolded position that said sun shelter is expanded to maximize said shading area thereof, and a folded position that said sun shelter is folded up to minimize said shading area thereof;

wherein said shading system further comprises an angular joint coupling said awning frame with said supporting frame, wherein said awning frame is operatively controlled by said functional controller to selectively adjust an orientation of said awning frame through said angular joint such that said sun shelter is adjusted to face towards the direction of the sun for maximizing a shading effect of said sun shelter;

wherein said shading system further comprises a sound module which is electrically linked to said environmental sensor device and is supported at said awning frame for generating an audio effect within said shading area, wherein said environmental sensor device comprises a movement sensor detecting said awning frame at said unfolded and folded positions, such that when said movement sensor detects said awning frame at said unfolded position, said sound module is automatically activated for generating said audio effect, and when said movement sensor detects said awning frame at said folded position, said sound module is automatically deactivated.

9. The intelligent outdoor sun shading device, as recited in claim 8, wherein said environmental sensor device further comprises a voice activator which is installed to said supporting frame and is electrically linked to said sound module, such that when said voice activator detects an audio command, said sound module is activated for generating said audio effect.

10. An intelligent outdoor sun shading device, comprising:

a shading system which comprises a supporting frame, a power source supported at said supporting frame, an awning frame suspendedly and movably supported by said supporting frame, and a sun shelter mounted to said awning frame to define a shading area under said sun shelter;

an environmental sensor device which is electrically linked to said power source and is installed to said shading system for detecting an environmental change of said shading area; and a functional controller which is electrically linked to said environmental sensor device and is operatively controlled said awning frame of said shading system, wherein when said functional controller receives a command signal from said environmental sensor device, said awning frame is automatically adjusted to regulate said shading area thereof in responsive to the environmental change of said shading system;

wherein said functional controller comprises an electric servo which is electrically linked to said power source and is operatively controlled by said functional controller to automatically and selectively actuate said awning frame between an unfolded position that said sun shelter is expanded to maximize said shading area thereof, and a folded position that said sun shelter is folded up to minimize said shading area thereof;

wherein said shading system further comprises an angular joint coupling said awning frame with said supporting frame, wherein said awning frame is operatively controlled by said functional controller to selectively adjust an orientation of said awning frame through said angular joint such that said sun shelter is adjusted to face towards the direction of the sun for maximizing a shading effect of said sun shelter;

wherein said environmental sensor device comprises a range detector which is installed to said awning frame and is electrically linked to said electric servo, such that when said range detector detects the presence of a user within an awning folding range at the time said awning frame is being folded to said unfolded position, said electric servo is automatically deactivated to stop said awning frame being folded to said unfolded position.

* * * * *